US012785879B2

(12) United States Patent
Su et al.

(10) Patent No.: US 12,785,879 B2
(45) Date of Patent: Nov. 3, 2026

(54) METHOD AND APPARATUS FOR TRANSMITTING TRAINING REFERENCE SIGNAL IN A MOBILE COMMUNICATION SYSTEM

(71) Applicant: Samsung Electronics Co., Ltd., Gyeonggi-do (KR)

(72) Inventors: Di Su, Beijing (CN); Chen Qian, Beijing (CN); Peng Lin, Beijing (CN); Qi Li, Beijing (CN)

(73) Assignee: Samsung Electronics Co., Ltd (KR)

( * ) Notice: Subject to any disclaimer, the term of this patent is extended or adjusted under 35 U.S.C. 154(b) by 289 days.

(21) Appl. No.: 18/293,480

(22) PCT Filed: Aug. 24, 2022

(86) PCT No.: PCT/KR2022/012641

§ 371 (c)(1),
(2) Date: Jan. 30, 2024

(87) PCT Pub. No.: WO2023/027501

PCT Pub. Date: Mar. 2, 2023

(65) Prior Publication Data

US 2024/0340127 A1 Oct. 10, 2024

(30) Foreign Application Priority Data

Aug. 27, 2021 (CN) ......................... 202110996961.2

(51) Int. Cl.
*H04L 5/00* (2006.01)
*H04W 72/0446* (2023.01)

(52) U.S. Cl.
CPC ....... *H04L 5/0048* (2013.01); *H04W 72/0446* (2013.01)

(58) Field of Classification Search
CPC ....... H04L 5/0048; H04L 1/20; H04L 1/0003; H04L 1/0025; H04L 5/0094;
(Continued)

(56) References Cited

U.S. PATENT DOCUMENTS

2011/0249581 A1 10/2011 Jen
2015/0110037 A1* 4/2015 Wu ....................... H04L 5/0048 370/329

(Continued)

FOREIGN PATENT DOCUMENTS

WO WO 2020/145879 7/2020
WO WO 2021/055169 3/2021
WO WO 2021/159553 8/2021

OTHER PUBLICATIONS

European Search Report dated Sep. 23, 2024 issued in counterpart application No. 22861710.6-1206, 9 pages.

(Continued)

*Primary Examiner* — Ivan O Latorre
(74) *Attorney, Agent, or Firm* — The Farrell Law Firm, P.C.

(57) ABSTRACT

The disclosure relates to a 5G or 6G communication system for supporting a higher data transmission rate. Provided herein is a method and apparatus for transmitting a reference signal. A method for transmitting a reference signal performed by a User Equipment (UE), comprising: determining a configuration of the reference signal; and transmitting/receiving the reference signal according to the configuration. Determining the configuration of the reference signal comprises determining one or more of: information related to transmit power of the reference signal; information related to modulation mode of the reference signal; information related to waveform of the reference signal; information related to transmission bandwidth of the reference signal; or information related to antenna ports for the reference signal.

(Continued)

Determining the configuration of the reference signal comprises at least one of the following: receiving the configuration of the reference signal through higher-layer signaling and/or downlink control information; or determining a configuration of respective physical channel(s)/physical signal (s), and determining the configuration of the reference signal according to the configuration of the corresponding physical channel(s)/physical signal(s).

20 Claims, 6 Drawing Sheets

(58) Field of Classification Search
CPC .... H04L 5/0051; H04L 1/08; H04W 72/0446; H04W 52/325
See application file for complete search history.

(56) References Cited

U.S. PATENT DOCUMENTS

2017/0215107 A1* 7/2017 Kakishima ............ H04W 72/23
2017/0238268 A1* 8/2017 Yang ................. H04W 72/0446 370/329
2017/0302419 A1* 10/2017 Liu ....................... H04W 72/23
2018/0007707 A1* 1/2018 Rico Alvarino ........ H04L 12/28
2019/0268852 A1 8/2019 Ryu et al.
2020/0153583 A1 5/2020 Jiang et al.
2020/0221311 A1 7/2020 Liu et al.
2021/0126677 A1 4/2021 Park et al.
2021/0266950 A1 8/2021 Namgoong et al.
2022/0006501 A1* 1/2022 Kim ...................... H04W 24/10
2022/0123886 A1* 4/2022 Munier ................. H04W 52/40
2022/0232589 A1* 7/2022 Yang ..................... H04W 72/23
2024/0235772 A1* 7/2024 Wang .................... H04L 5/0051
2024/0340127 A1* 10/2024 Su ............................. H04L 1/08
2025/0142584 A1* 5/2025 Keating ............ H04L 27/26025

OTHER PUBLICATIONS

European Search Report dated Jul. 3, 2025 issued in counterpart application No. 22861710.6-1206, 8 pages.

PCT/ISA/210 Search Report dated Nov. 21, 2022, issued on PCT/KR2022/012641, pp. 3.

PCT/ISA/237 Written Opinion dated Nov. 21, 2022, issued on PCT/KR2022/012641, pp. 6.

* cited by examiner

[Fig. 1]
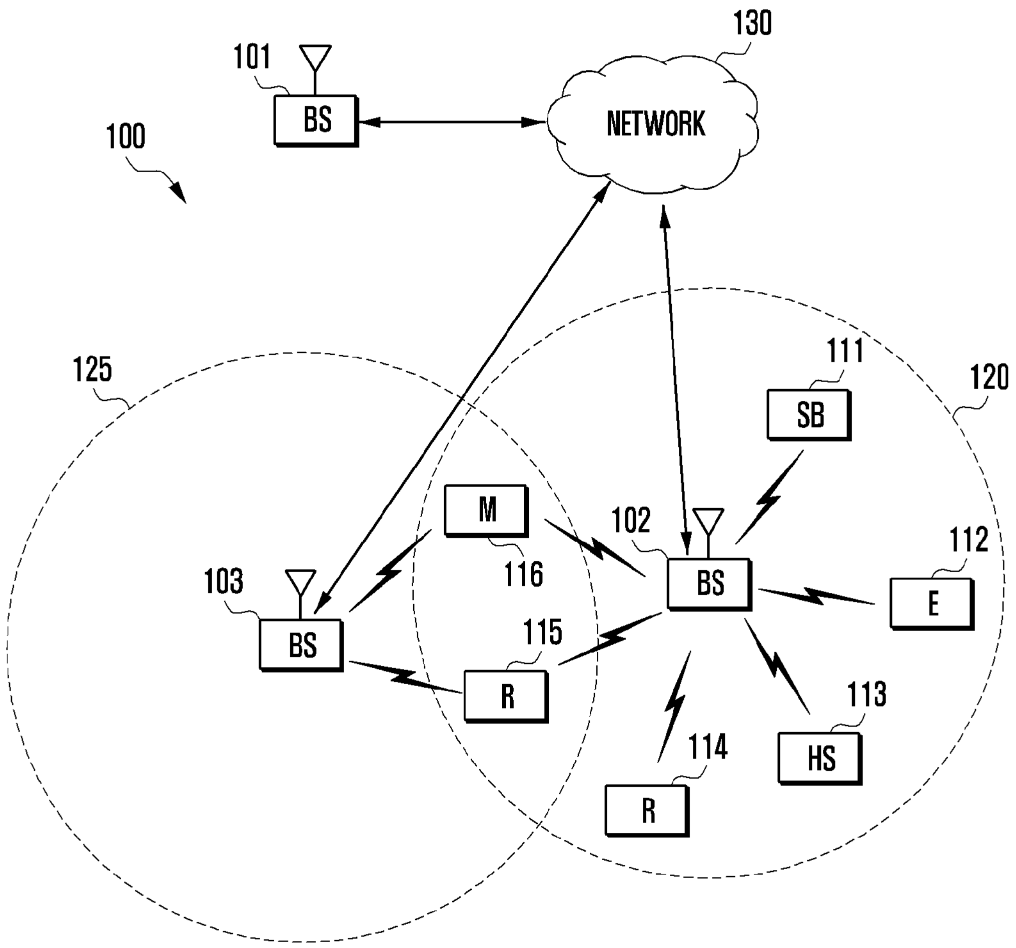

[Fig. 3A]
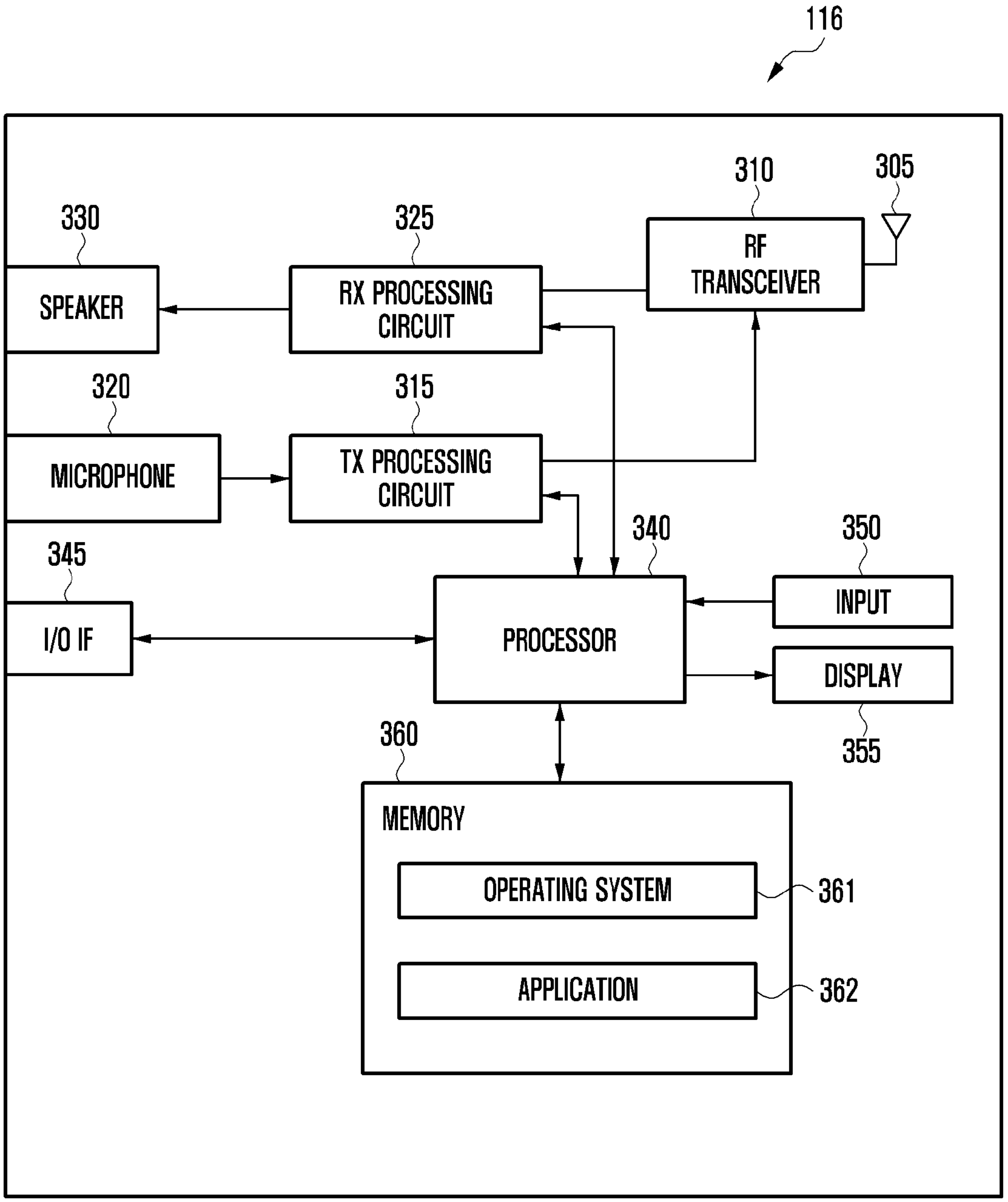

[Fig. 3B]
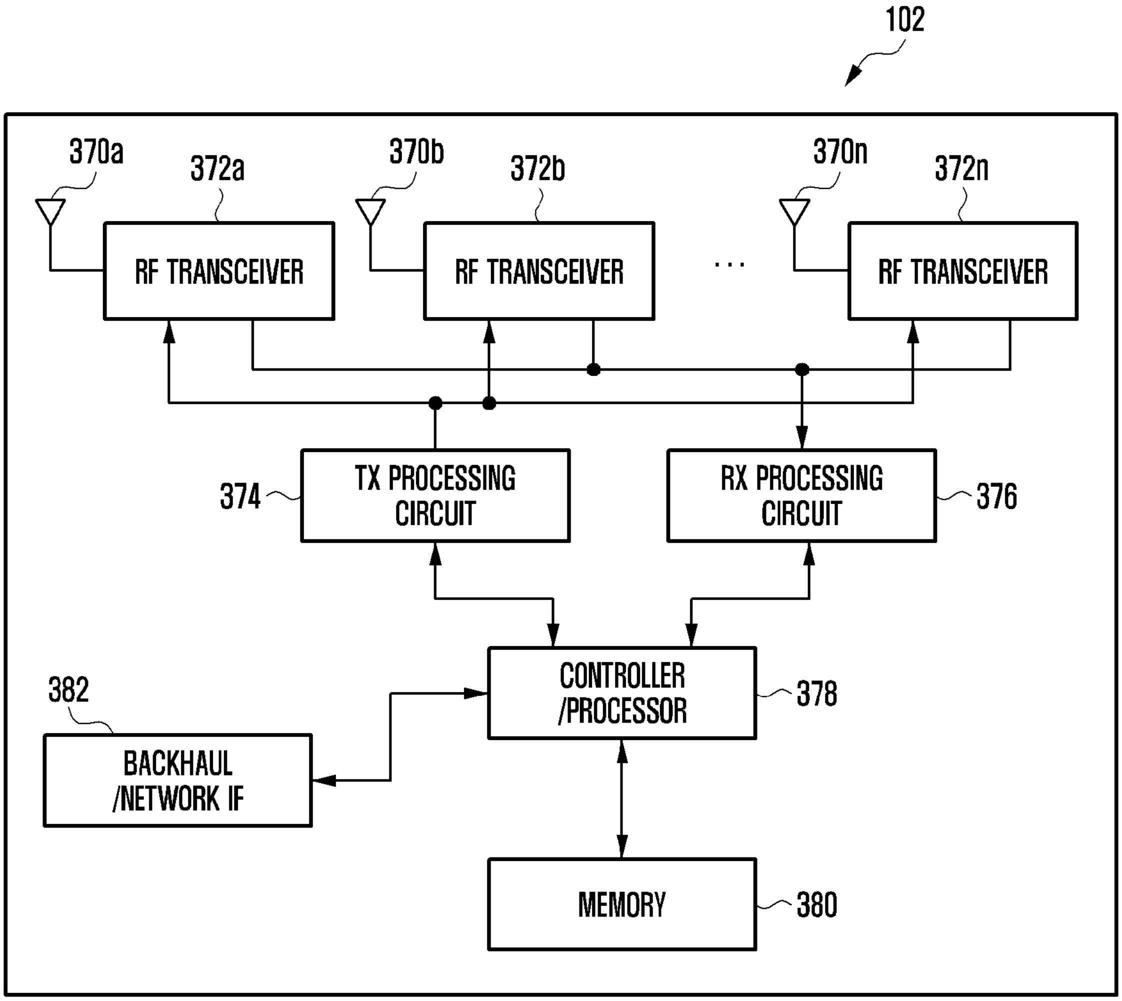
[Fig. 4]
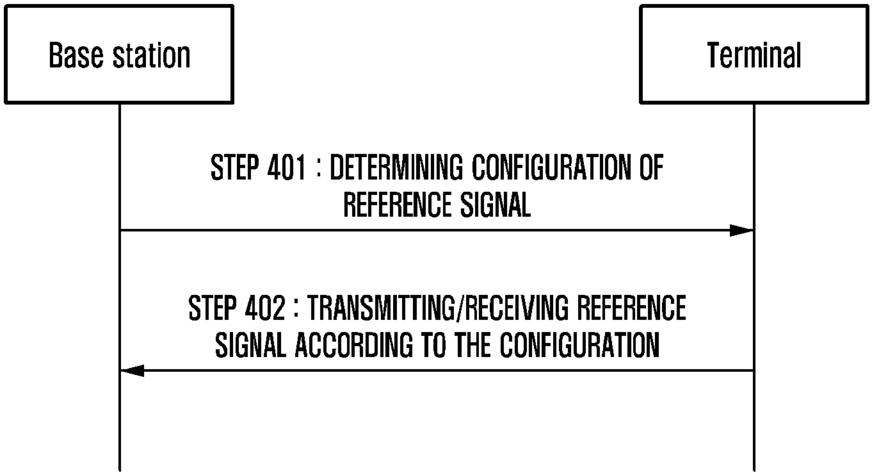

[Fig. 5]
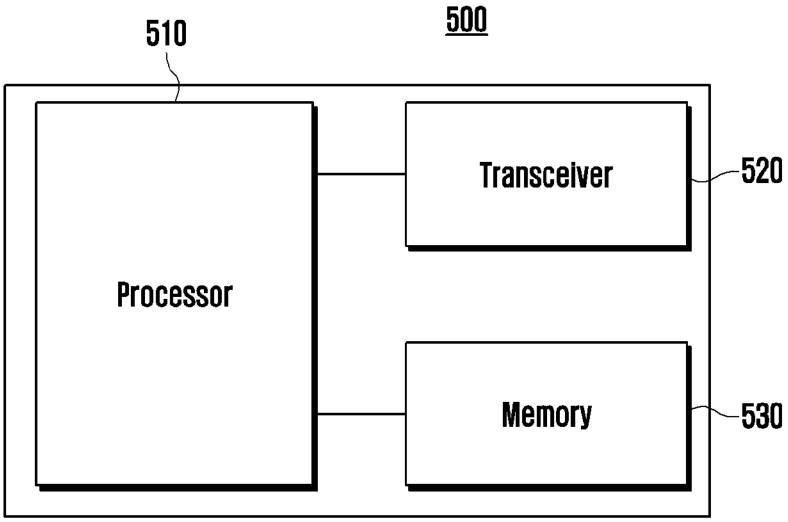
[Fig. 6]
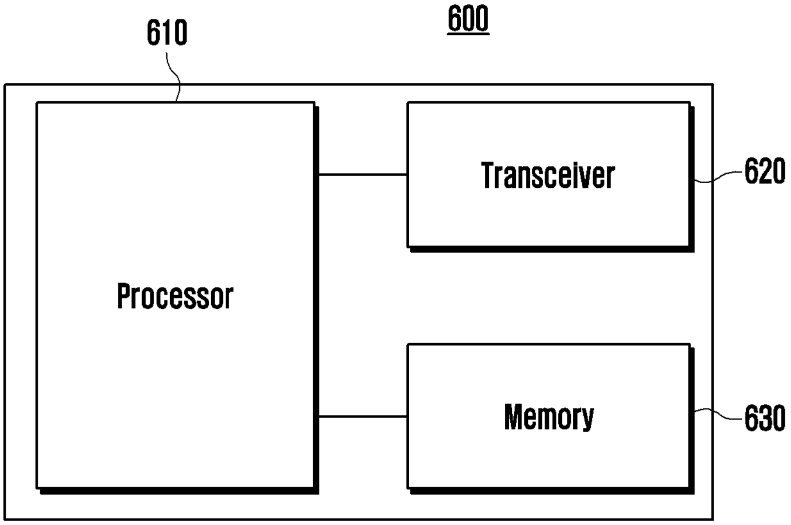

METHOD AND APPARATUS FOR TRANSMITTING TRAINING REFERENCE SIGNAL IN A MOBILE COMMUNICATION SYSTEM

PRIORITY

This application is a National Phase Entry of PCT International Application No. PCT/KR2022/012641, which was filed on Aug. 24, 2022, and claims priority to Chinese Patent Application No. 202110996961.2, which was filed on Aug. 27, 2021, the entire content of each of which is incorporated herein by reference.

TECHNICAL FIELD

The present application relates to a method and apparatus for transmitting or receiving a training reference signal and a corresponding apparatus.

BACKGROUND ART

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

DISCLOSURE OF INVENTION

Technical Problem

The present invention has been made to provide at least the advantages described below. For more enhanced communication system, there is a need for transmitting reference signal effectively.

Solution to Problem

According to an aspect of the present disclosure, there is provided a method for transmitting a reference signal performed by a User Equipment (UE), comprising: determining a configuration of the reference signal; and transmitting/receiving the reference signal according to the configuration. In a further embodiment, determining the configuration of the reference signal comprises determining one or more of: information related to transmit power of the reference signal; information related to modulation mode of the reference signal; information related to waveform of the reference signal; information related to transmission bandwidth of the reference signal; or information related to antenna ports for the reference signal. In a further embodiment, determining the configuration of the reference signal comprises at least one of the following: receiving the configuration of the reference signal through higher-layer signaling and/or downlink control information; or determining a configuration of respective physical channel(s)/physical signal(s), and determining the configuration of the reference signal according to the configuration of the corresponding physical channel(s)/physical signal(s).

In one embodiment, the configuration of the reference signal comprises: information related to a time unit configuration of the reference signal, wherein the information related to the time unit configuration of the reference signal comprises at least one of the following: a period of the time unit(s), number of the time units in a single period, position(s) of the time unit(s) in a single period, number of training/repetition times of the time unit(s) in a single period, number of aperiodic time units, position(s) of the aperiodic time unit(s), and number of training times/repetition times of the aperiodic time unit(s).

In a further embodiment, in the case where the time unit(s) is periodic, determining the period of the time unit(s) is implemented by: in the case where the corresponding physical channel(s) is an uplink shared channel, obtaining a period configuration information according to a configured grant signaling of the uplink shared channel, and determining the period according to the obtained period configuration information; and/or in the case where the corresponding physical channel(s) is a downlink shared channel, obtaining the period configuration information according to a semi-persistent scheduling configuration of the downlink shared channel, and determining the period according to the obtained period configuration information.

In a more specific embodiment, the positions of the time units of the reference signal in a single period or the aperiodic time unit(s) of the reference signal comprise at least one of the following: information related to position of first symbol in the time unit(s); information related to position of last symbol in the time unit(s); intervals between the first symbol in the time unit(s) and last symbols of demodulation reference signals of uplink/downlink shared channel; intervals between the last symbol in the time unit(s) and first symbols of the demodulation reference signals of uplink/downlink shared channel; intervals between the first symbol in the time unit(s) and the last symbols of the uplink/downlink shared channel; or intervals between the last symbol in the time unit(s) and the first symbols of the uplink/downlink shared channel.

In a further embodiment, the positions of the time units of the reference signal in a single period or the aperiodic time unit(s) of the reference signal are configured in one or more implementation of the following: preconfiguring or configuring based on the configuration information from the base station, the positions of the first or last symbols in the determined time units; preconfiguring or configuring based on the configuration information from the base station, the positions of the last symbols in the determined time units; preconfiguring or configuring based on the configuration information from the base station, the first symbols in the determined time units, as being spaced N time units apart from the last symbols of the demodulation reference signals of uplink/downlink shared channel; or preconfiguring or configuring based on the configuration information apart from the base station, the last symbols in the determined time units, as being spaced N time units apart from the first symbols of the demodulation reference signals of uplink/downlink shared channel; or preconfiguring or configuring based on the configuration information from the base station, the first symbols in the determined time units, as being spaced N time units apart from the last symbols of the demodulation reference signals of uplink/downlink shared channel; or preconfiguring or configuring based on the configuration information from the base station, the last symbols in the determined time units, as being spaced N time units apart from the first symbols of the demodulation reference signals of uplink/downlink shared channel, where N is an integer greater than or equal to zero.

In an embodiment, in the case where the obtained time unit configuration is a periodic time unit configuration, obtaining an indication message for enabling the periodic time unit configuration through downlink control information, the indication message being used to indicate whether to make the periodic time unit configuration effective; and/or in the case where the obtained time unit configuration is an aperiodic time unit configuration, obtaining an indication message for enabling the aperiodic time unit configuration through downlink control information, the indication message being used to indicate whether to make the aperiodic time unit configuration effective, and/or the positions of the aperiodic time units are associated with position(s) of time unit(s) of uplink/downlink shared channel scheduled by the downlink control information.

In a further embodiment, determining the configuration of the reference signal according to the configuration of respective physical channel(s)/physical signal(s) comprises: the configuration of the reference signal being the same as the configuration of the corresponding physical channel(s)/physical signal(s).

In a more detailed embodiment, the transmit power of the reference signal is determined to be the same as the transmit power of the corresponding physical channel(s) or physical signal(s); and/or the waveform of the reference signal is determined to be the same as the waveform of the corresponding physical channel(s) or physical signal(s); and/or the modulation mode of the reference signal is determined to be the same as the modulation mode of the corresponding physical channel(s) or physical signal(s); and/or the transmission bandwidth of the reference signal is determined to be the same as the transmission bandwidth of the corresponding physical channel(s) or physical signal(s); and/or any antenna port for the reference signal is determined to be the same as at least one of the antenna ports for the corresponding physical channel(s) or the physical signal(s).

In a further embodiment, in the case where the reference signal is a downlink reference signal, and it cannot be guaranteed that a transmit power of the downlink reference signal and that of a specific physical channel are the same, obtaining indication information which indicates that these two transmit powers are different, through higher-layer signaling and/or downlink control information, and determining not to transmit or receive the reference signal based on the indication information.

In a further embodiment, in the case where the reference signal is an uplink reference signal, not transmitting any uplink channel/uplink signal in time unit(s) to which the reference signal is allocated; and/or in the case where the reference signal is a downlink reference signal, not receiving any downlink channel/downlink signal in time unit(s) to which the reference signal is allocated.

In a further embodiment, in the case where time unit(s) of the reference signal is configured to be periodic and the reference signal is an uplink reference signal, determining whether to transmit the reference signal in duration of a single period, according to transmissions of corresponding uplink physical channel(s)/physical signal(s) in duration of the period; and/or in the case where the time unit(s) of the reference signal is configured to be periodic and the reference signal is a downlink reference signal, determining whether to receive the reference signal in duration of a single period, according to receptions of respective downlink physical channel(s)/physical signal(s) in duration of the period.

In a further embodiment, wherein the reference signal is a demodulation reference signal or part of the demodulation reference signal, and the determined configuration indicates that position(s) of time unit(s) of the reference signal is part of time units of the demodulation reference signal of an uplink/downlink shared channel.

In a further embodiment, in the case where a corresponding uplink physical channel(s)/physical signal(s) is transmitted in a duration of a single period, and a time for transmitting the corresponding uplink physical channel(s)/physical signal(s) in the duration is after a timing when the reference signal is scheduled to be transmitted, transmitting the reference signal in duration of the period; otherwise, not transmitting the reference signal; and/or in the case where corresponding downlink physical channel/physical signal is received in duration of a single period, and a time for receiving the respective downlink physical channel/physical signal in the duration is after a timing when the reference signal is scheduled to be received, receiving the reference signal in duration of the period; otherwise, not receiving the reference signal.

According to another aspect of the present disclosure, there is provided a terminal comprising: a transceiver; and a processor configured to perform the method as described above.

According to another aspect of the present disclosure, there is provided a method for transmitting a reference signal performed by a base station, comprising: determining a configuration of the reference signal; and transmitting/receiving the reference signal according to the configuration.

In one embodiment, determining the configuration of the reference signal comprises determining one or more of: information related to transmit power of the reference signal; information related to modulation mode of the reference signal; information related to waveform of the reference signal; information related to transmission bandwidth of the reference signal; or information related to antenna ports for the reference signal.

In a further embodiment, determining the configuration of the reference signal comprises at least one of the following: receiving the configuration of the reference signal through higher-layer signaling and/or downlink control information; or determining a configuration of respective physical channel(s)/physical signal(s), and determining the configuration of the reference signal according to the configuration of the corresponding physical channel(s)/physical signal(s).

In one embodiment, the configuration of the reference signal comprises: information related to a time unit configuration of the reference signal, wherein the information related to the time unit configuration of the reference signal comprises at least one of the following: a period of the time unit(s), number of the time units in a single period, position(s) of the time unit(s) in a single period, number of training/repetition times of the time unit(s) in a single period, number of aperiodic time units, position(s) of the aperiodic time unit(s), and number of training times/repetition times of the aperiodic time unit(s).

In one embodiment, in the case where the time units is periodic, obtaining the period of the time unit(s) is implemented by: in the case where the corresponding physical channel(s) is a downlink shared channel, transmitting the period configuration information according to a semi-persistent scheduling configuration of the downlink shared channel, and determining the period according to the obtained period configuration information.

In a more specific embodiment, the positions of the time units of the reference signal in a single period or the aperiodic time unit(s) of the reference signal comprise at least one of the following: information related to position of first symbol in the time unit(s); information related to position of last symbol in the time unit(s); intervals between the first symbol in the time unit(s) and last symbols of demodulation reference signals of uplink/downlink shared channel; intervals between the last symbol in the time unit(s) and first symbols of the demodulation reference signals of uplink/downlink shared channel; intervals between the first symbol in the time unit(s) and the last symbols of the uplink/downlink shared channel; or intervals between the last symbol in the time unit(s) and the first symbols of the uplink/downlink shared channel.

In a further embodiment, the positions of the time units of the reference signal in a single period or the aperiodic time unit(s) of the reference signal are configured in one or more implementation of the following: preconfiguring or configuring based on the configuration information from the base station, the positions of the first or last symbols in the determined time units; preconfiguring or configuring based on the configuration information from the base station, the positions of the last symbols in the determined time units; preconfiguring or configuring based on the configuration information from the base station, the first symbols in the determined time units, as being spaced N time units apart from the last symbols of the demodulation reference signals of uplink/downlink shared channel; or preconfiguring or configuring based on the configuration information from the base station, the last symbols in the determined time units, as being spaced N time units apart from the first symbols of the demodulation reference signals of uplink/downlink shared channel; or preconfiguring or configuring based on the configuration information from the base station, the first symbols in the determined time units, as being spaced N time units apart from the last symbols of the demodulation reference signals of uplink/downlink shared channel; or preconfiguring or configuring based on the configuration information from the base station, the last symbols in the determined time units, as being spaced N time units apart from the first symbols of the demodulation reference signals of uplink/downlink shared channel, where N is an integer greater than or equal to zero.

In one embodiment, in the case where the obtained time unit configuration is a periodic time unit configuration, obtaining an indication message for enabling the periodic time unit configuration through downlink control information, the indication message being used to indicate whether to enable the periodic time unit configuration; and/or in the case where the obtained time unit configuration is an aperiodic time unit configuration, obtaining an indication message for enabling the aperiodic time unit configuration through downlink control information, the indication message being used to indicate whether to enable the aperiodic time unit configuration, and/or the positions of the aperiodic time units are associated with position(s) of time unit(s) of uplink/downlink shared channel scheduled by the downlink control information.

In a further embodiment, determining the configuration of the reference signal according to the configuration of respective physical channel(s)/physical signal(s) comprises: the configuration of the reference signal being the same as the configuration of the corresponding physical channel(s)/physical signal(s).

In a specific embodiment, the transmit power of the reference signal is determined to be the same as the transmit power of the corresponding physical channel(s) or physical signal(s); and/or the waveform of the reference signal is determined to be the same as the waveform of the corresponding physical channel(s) or physical signal(s); and/or the modulation mode of the reference signal is determined to be the same as the modulation mode of the corresponding physical channel(s) or physical signal(s); and/or the transmission bandwidth of the reference signal is determined to be the same as the transmission bandwidth of the corresponding physical channel(s) or physical signal(s); and/or any antenna port for the reference signal is determined to be the same as at least one of the antenna ports for the corresponding physical channel(s) or the physical signal(s).

In one embodiment, in the case where the reference signal is a downlink reference signal, and it cannot be ensured that a transmit power of the downlink reference signal and that of a specific physical channel are the same, transmitting indication information which indicates that the transmit powers of the downlink reference signal and the specific physical channel are different, through higher-layer signaling and/or downlink control information, and determining not to transmit or receive the reference signal based on the indication information.

In one embodiment, in the case where the reference signal is an uplink reference signal, not receiving any uplink channel/uplink signal in time unit(s) to which the reference signal is allocated; and/or in the case where the reference signal is a downlink reference signal, not receiving any downlink channel/downlink signal in time unit(s) to which the reference signal is allocated.

In one embodiment, in the case where time unit(s) of the reference signal is configured to be periodic and the reference signal is an uplink reference signal, determining whether to receive the reference signal in duration of a single period, according to receptions of respective uplink physical channel(s)/physical signal(s) in duration of the period; and/or in the case where the time unit(s) of the reference signal is configured to be periodic and the reference signal is a downlink reference signal, determining whether to transmit the reference signal in duration of a single period, according to transmissions of corresponding downlink physical channel(s)/physical signal(s) in duration of the period.

In one embodiment, wherein the reference signal is a demodulation reference signal or part of the demodulation reference signal, and the determined configuration indicates that position(s) of time unit(s) of the reference signal is part of time units of the demodulation reference signal of an uplink/downlink shared channel.

In one embodiment, in the case where respective uplink physical channel(s)/physical signal(s) is received in a duration of a single period, and a time for receiving the respective uplink physical channel(s)/physical signal(s) in the duration is after a timing when the reference signal is scheduled to be received, receiving the reference signal in duration of the period; otherwise, not expecting to receive the reference signal; and/or in the case where respective downlink physical channel(s)/physical signal(s) is transmitted in duration of a single period, and a time for transmitting the corresponding downlink physical channel(s)/physical signal(s) in the duration is after a timing when the reference signal is scheduled to be transmitted, transmitting the reference signal in duration of the period; otherwise, not transmitting the reference signal.

According to another aspect of the present disclosure, there is provided a base station comprising: a transceiver; and a processor configured to control the transceiver to perform the method as described above.

Advantageous Effects of Invention

Advantages, and salient feature of the invention will become apparent to those skilled in the art from the following detailed description, which, taken in conjunction with the annexed drawing, discloses exemplary embodiments of the invention. According to embodiments of the present disclosure, method and apparatus for transmitting training reference signal is provided.

BRIEF DESCRIPTION OF DRAWINGS

FIG. 1 illustrates an example wireless network according to various embodiments of the present disclosure;

FIG. 3A illustrates an example UE according to the present disclosure;

FIG. 3B illustrates an example gNB according to the present disclosure; and

FIG. 4 illustrates an example method according to the present disclosure.

FIG. 5 illustrates an electronic device according to embodiments of the present disclosure; and FIG. 6 illustrates a node entity according to embodiments of the present disclosure.

MODE FOR THE INVENTION

Figure 2A:
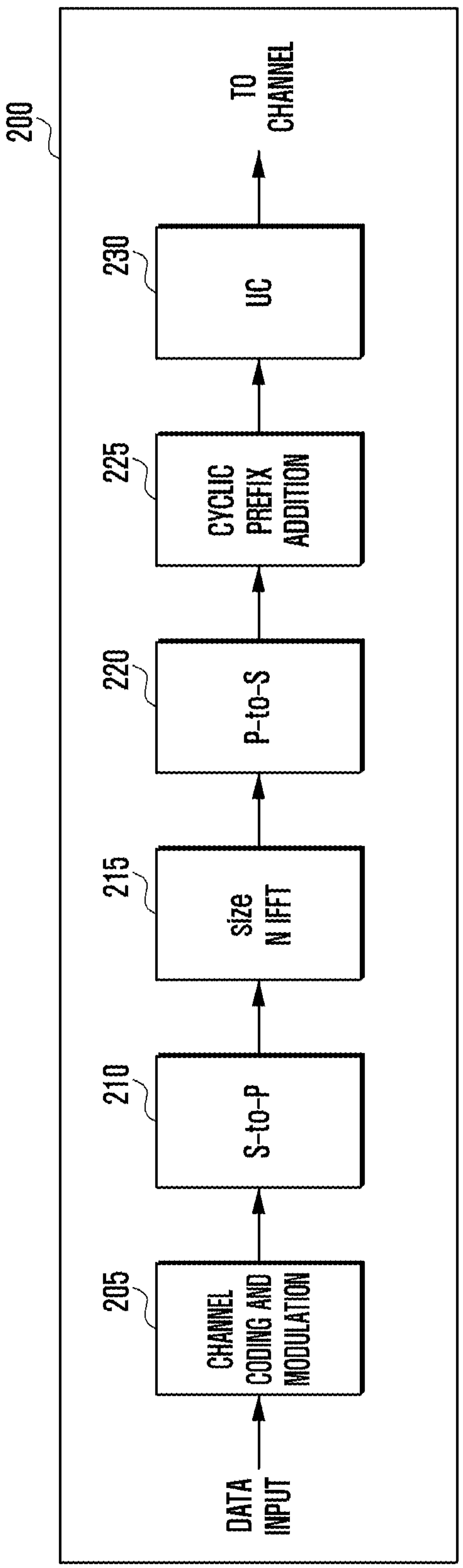
FIG. 2A illustrates example wireless transmission and reception paths respectively according to the present disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

According to an aspect of the present disclosure, there is provided a method for transmitting a reference signal performed by a User Equipment (UE), comprising: determining a configuration of the reference signal; and transmitting/receiving the reference signal according to the configuration. In a further embodiment, determining the configuration of the reference signal comprises determining one or more of: information related to transmit power of the reference signal; information related to modulation mode of the reference signal; information related to waveform of the reference signal; information related to transmission bandwidth of the reference signal; or information related to antenna ports for the reference signal. In a further embodiment, determining the configuration of the reference signal comprises at least one of the following: receiving the configuration of the reference signal through higher-layer signaling and/or downlink control information; or determining a configuration of respective physical channel(s)/physical signal(s), and determining the configuration of the reference signal according to the configuration of the corresponding physical channel(s)/physical signal(s).

In one embodiment, the configuration of the reference signal comprises: information related to a time unit configuration of the reference signal, wherein the information related to the time unit configuration of the reference signal comprises at least one of the following: a period of the time unit(s), number of the time units in a single period, position(s) of the time unit(s) in a single period, number of training/repetition times of the time unit(s) in a single period, number of aperiodic time units, position(s) of the aperiodic time unit(s), and number of training times/repetition times of the aperiodic time unit(s).

In a further embodiment, in the case where the time unit(s) is periodic, determining the period of the time unit(s) is implemented by: in the case where the corresponding physical channel(s) is an uplink shared channel, obtaining a period configuration information according to a configured grant signaling of the uplink shared channel, and determining the period according to the obtained period configuration information; and/or in the case where the corresponding physical channel(s) is a downlink shared channel, obtaining the period configuration information according to a semi-persistent scheduling configuration of the downlink shared channel, and determining the period according to the obtained period configuration information.

In a more specific embodiment, the positions of the time units of the reference signal in a single period or the aperiodic time unit(s) of the reference signal comprise at least one of the following: information related to position of first symbol in the time unit(s); information related to position of last symbol in the time unit(s); intervals between the first symbol in the time unit(s) and last symbols of demodulation reference signals of uplink/downlink shared channel; intervals between the last symbol in the time unit(s) and first symbols of the demodulation reference signals of uplink/downlink shared channel; intervals between the first symbol in the time unit(s) and the last symbols of the uplink/downlink shared channel; or intervals between the last symbol in the time unit(s) and the first symbols of the uplink/downlink shared channel.

In a further embodiment, the positions of the time units of the reference signal in a single period or the aperiodic time unit(s) of the reference signal are configured in one or more implementation of the following: preconfiguring or configuring based on the configuration information from the base station, the positions of the first or last symbols in the determined time units; preconfiguring or configuring based on the configuration information from the base station, the positions of the last symbols in the determined time units; preconfiguring or configuring based on the configuration information from the base station, the first symbols in the determined time units, as being spaced N time units apart from the last symbols of the demodulation reference signals of uplink/downlink shared channel; or preconfiguring or configuring based on the configuration information apart from the base station, the last symbols in the determined time units, as being spaced N time units apart from the first symbols of the demodulation reference signals of uplink/downlink shared channel; or preconfiguring or configuring based on the configuration information from the base station, the first symbols in the determined time units, as being spaced N time units apart from the last symbols of the demodulation reference signals of uplink/downlink shared channel; or preconfiguring or configuring based on the configuration information from the base station, the last symbols in the determined time units, as being spaced N time units apart from the first symbols of the demodulation reference signals of uplink/downlink shared channel, where N is an integer greater than or equal to zero.

In an embodiment, in the case where the obtained time unit configuration is a periodic time unit configuration, obtaining an indication message for enabling the periodic time unit configuration through downlink control information, the indication message being used to indicate whether to make the periodic time unit configuration effective; and/or in the case where the obtained time unit configuration is an aperiodic time unit configuration, obtaining an indication message for enabling the aperiodic time unit configuration through downlink control information, the indication message being used to indicate whether to make the aperiodic time unit configuration effective, and/or the positions of the aperiodic time units are associated with position(s) of time unit(s) of uplink/downlink shared channel scheduled by the downlink control information.

In a further embodiment, determining the configuration of the reference signal according to the configuration of respective physical channel(s)/physical signal(s) comprises: the configuration of the reference signal being the same as the configuration of the corresponding physical channel(s)/physical signal(s).

In a more detailed embodiment, the transmit power of the reference signal is determined to be the same as the transmit power of the corresponding physical channel(s) or physical signal(s); and/or the waveform of the reference signal is determined to be the same as the waveform of the corresponding physical channel(s) or physical signal(s); and/or the modulation mode of the reference signal is determined to be the same as the modulation mode of the corresponding physical channel(s) or physical signal(s); and/or the transmission bandwidth of the reference signal is determined to be the same as the transmission bandwidth of the corresponding physical channel(s) or physical signal(s); and/or any antenna port for the reference signal is determined to be the same as at least one of the antenna ports for the corresponding physical channel(s) or the physical signal(s).

In a further embodiment, in the case where the reference signal is a downlink reference signal, and it cannot be guaranteed that a transmit power of the downlink reference signal and that of a specific physical channel are the same, obtaining indication information which indicates that these two transmit powers are different, through higher-layer signaling and/or downlink control information, and determining not to transmit or receive the reference signal based on the indication information.

In a further embodiment, in the case where the reference signal is an uplink reference signal, not transmitting any uplink channel/uplink signal in time unit(s) to which the reference signal is allocated; and/or in the case where the reference signal is a downlink reference signal, not receiving any downlink channel/downlink signal in time unit(s) to which the reference signal is allocated.

In a further embodiment, in the case where time unit(s) of the reference signal is configured to be periodic and the reference signal is an uplink reference signal, determining whether to transmit the reference signal in duration of a single period, according to transmissions of corresponding uplink physical channel(s)/physical signal(s) in duration of the period; and/or in the case where the time unit(s) of the reference signal is configured to be periodic and the reference signal is a downlink reference signal, determining whether to receive the reference signal in duration of a single period, according to receptions of respective downlink physical channel(s)/physical signal(s) in duration of the period.

In a further embodiment, wherein the reference signal is a demodulation reference signal or part of the demodulation reference signal, and the determined configuration indicates that position(s) of time unit(s) of the reference signal is part of time units of the demodulation reference signal of an uplink/downlink shared channel.

In a further embodiment, in the case where a corresponding uplink physical channel(s)/physical signal(s) is transmitted in a duration of a single period, and a time for transmitting the corresponding uplink physical channel(s)/ physical signal(s) in the duration is after a timing when the reference signal is scheduled to be transmitted, transmitting the reference signal in duration of the period; otherwise, not transmitting the reference signal; and/or in the case where corresponding downlink physical channel/physical signal is received in duration of a single period, and a time for receiving the respective downlink physical channel/physical signal in the duration is after a timing when the reference signal is scheduled to be received, receiving the reference signal in duration of the period; otherwise, not receiving the reference signal.

According to another aspect of the present disclosure, there is provided a terminal comprising: a transceiver; and a processor configured to perform the method as described above.

According to another aspect of the present disclosure, there is provided a method for transmitting a reference signal performed by a base station, comprising: determining a configuration of the reference signal; and transmitting/receiving the reference signal according to the configuration.

In one embodiment, determining the configuration of the reference signal comprises determining one or more of: information related to transmit power of the reference signal; information related to modulation mode of the reference signal; information related to waveform of the reference signal; information related to transmission bandwidth of the reference signal; or information related to antenna ports for the reference signal.

In a further embodiment, determining the configuration of the reference signal comprises at least one of the following: receiving the configuration of the reference signal through higher-layer signaling and/or downlink control information; or determining a configuration of respective physical channel(s)/physical signal(s), and determining the configuration of the reference signal according to the configuration of the corresponding physical channel(s)/physical signal(s).

In one embodiment, the configuration of the reference signal comprises: information related to a time unit configuration of the reference signal, wherein the information related to the time unit configuration of the reference signal comprises at least one of the following: a period of the time unit(s), number of the time units in a single period, position(s) of the time unit(s) in a single period, number of training/repetition times of the time unit(s) in a single period, number of aperiodic time units, position(s) of the aperiodic time unit(s), and number of training times/repetition times of the aperiodic time unit(s).

In one embodiment, in the case where the time units is periodic, obtaining the period of the time unit(s) is implemented by: in the case where the corresponding physical channel(s) is a downlink shared channel, transmitting the period configuration information according to a semi-persistent scheduling configuration of the downlink shared channel, and determining the period according to the obtained period configuration information.

In a more specific embodiment, the positions of the time units of the reference signal in a single period or the aperiodic time unit(s) of the reference signal comprise at least one of the following: information related to position of first symbol in the time unit(s); information related to position of last symbol in the time unit(s); intervals between the first symbol in the time unit(s) and last symbols of demodulation reference signals of uplink/downlink shared channel; intervals between the last symbol in the time unit(s) and first symbols of the demodulation reference signals of uplink/downlink shared channel; intervals between the first symbol in the time unit(s) and the last symbols of the uplink/downlink shared channel; or intervals between the last symbol in the time unit(s) and the first symbols of the uplink/downlink shared channel.

In a further embodiment, the positions of the time units of the reference signal in a single period or the aperiodic time unit(s) of the reference signal are configured in one or more implementation of the following: preconfiguring or configuring based on the configuration information from the base station, the positions of the first or last symbols in the determined time units; preconfiguring or configuring based on the configuration information from the base station, the positions of the last symbols in the determined time units; preconfiguring or configuring based on the configuration information from the base station, the first symbols in the determined time units, as being spaced N time units apart from the last symbols of the demodulation reference signals of uplink/downlink shared channel; or preconfiguring or configuring based on the configuration information from the base station, the last symbols in the determined time units, as being spaced N time units apart from the first symbols of the demodulation reference signals of uplink/downlink shared channel; or preconfiguring or configuring based on the configuration information from the base station, the first symbols in the determined time units, as being spaced N time units apart from the last symbols of the demodulation reference signals of uplink/downlink shared channel; or preconfiguring or configuring based on the configuration information from the base station, the last symbols in the determined time units, as being spaced N time units apart from the first symbols of the demodulation reference signals of uplink/downlink shared channel, where N is an integer greater than or equal to zero.

In one embodiment, in the case where the obtained time unit configuration is a periodic time unit configuration, obtaining an indication message for enabling the periodic time unit configuration through downlink control information, the indication message being used to indicate whether to enable the periodic time unit configuration; and/or in the case where the obtained time unit configuration is an aperiodic time unit configuration, obtaining an indication message for enabling the aperiodic time unit configuration through downlink control information, the indication message being used to indicate whether to enable the aperiodic time unit configuration, and/or the positions of the aperiodic time units are associated with position(s) of time unit(s) of uplink/downlink shared channel scheduled by the downlink control information.

In a further embodiment, determining the configuration of the reference signal according to the configuration of respective physical channel(s)/physical signal(s) comprises: the configuration of the reference signal being the same as the configuration of the corresponding physical channel(s)/physical signal(s).

In a specific embodiment, the transmit power of the reference signal is determined to be the same as the transmit power of the corresponding physical channel(s) or physical signal(s); and/or the waveform of the reference signal is determined to be the same as the waveform of the corresponding physical channel(s) or physical signal(s); and/or the modulation mode of the reference signal is determined to be the same as the modulation mode of the corresponding physical channel(s) or physical signal(s); and/or the transmission bandwidth of the reference signal is determined to be the same as the transmission bandwidth of the corresponding physical channel(s) or physical signal(s); and/or any antenna port for the reference signal is determined to be the same as at least one of the antenna ports for the corresponding physical channel(s) or the physical signal(s).

In one embodiment, in the case where the reference signal is a downlink reference signal, and it cannot be ensured that a transmit power of the downlink reference signal and that of a specific physical channel are the same, transmitting indication information which indicates that the transmit powers of the downlink reference signal and the specific physical channel are different, through higher-layer signaling and/or downlink control information, and determining not to transmit or receive the reference signal based on the indication information.

In one embodiment, in the case where the reference signal is an uplink reference signal, not receiving any uplink channel/uplink signal in time unit(s) to which the reference signal is allocated; and/or in the case where the reference signal is a downlink reference signal, not receiving any downlink channel/downlink signal in time unit(s) to which the reference signal is allocated.

In one embodiment, in the case where time unit(s) of the reference signal is configured to be periodic and the reference signal is an uplink reference signal, determining whether to receive the reference signal in duration of a single period, according to receptions of respective uplink physical channel(s)/physical signal(s) in duration of the period; and/or in the case where the time unit(s) of the reference signal is configured to be periodic and the reference signal is a downlink reference signal, determining whether to transmit the reference signal in duration of a single period, according to transmissions of corresponding downlink physical channel(s)/physical signal(s) in duration of the period.

In one embodiment, wherein the reference signal is a demodulation reference signal or part of the demodulation reference signal, and the determined configuration indicates that position(s) of time unit(s) of the reference signal is part of time units of the demodulation reference signal of an uplink/downlink shared channel.

In one embodiment, in the case where respective uplink physical channel(s)/physical signal(s) is received in a duration of a single period, and a time for receiving the respective uplink physical channel(s)/physical signal(s) in the duration is after a timing when the reference signal is scheduled to be received, receiving the reference signal in duration of the period; otherwise, not expecting to receive the reference signal; and/or in the case where respective downlink physical channel(s)/physical signal(s) is transmitted in duration of a single period, and a time for transmitting the corresponding downlink physical channel(s)/physical signal(s) in the duration is after a timing when the reference signal is scheduled to be transmitted, transmitting the reference signal in duration of the period; otherwise, not transmitting the reference signal.

According to another aspect of the present disclosure, there is provided a base station comprising: a transceiver; and a processor configured to control the transceiver to perform the method as described above.

Exemplary embodiments of the present disclosure are further described below in conjunction with the accompanying drawings.

The text and figures are provided by way of example only to assist the reader in understanding the present disclosure. They are not intended and should not be construed to limit the scope of the present disclosure in any way. While certain embodiments and examples have been provided, based on the disclosure herein, it shall be apparent to those skilled in the art that changes may be made to the illustrated embodiments and examples without departing from the scope of the present disclosure.

The embodiments are merely described below, by referring to the accompanying drawings, to explain various aspects. As used herein, the term "and/or" includes any one and all combinations of one or more of the associated listed items. Expressions such as "at least a," "at least one," when preceding a list of elements, modify the entire list of elements, but not individual elements of the list, such that expressions "at least one of a, b, and c" or similar expressions include only a, only b, only c, only a and b, only a and c, only b and c, and all of a, b and c.

Terms used in this specification will be briefly described, and the present disclosure will be described in detail.

Regarding terms in various embodiments of the present disclosure, general terms currently widely used are selected in consideration of functions of structural elements in various embodiments of the present disclosure. However, the meanings of the terms may change depending on intents, judicial precedents, and advent of new technologies, etc. Also, in some cases, less commonly used terms may be selected. In this case, the meanings of these terms will be described in detail in the corresponding part in the description of the present disclosure. Therefore, terms used in various embodiments of the present disclosure should be defined based on the meanings and description of the terms provided herein.

Any embodiment disclosed herein may be combined with any other embodiments, and references to "an embodiment," "some embodiments," "alternative embodiments," "various embodiments," "one embodiment," etc., are not necessarily mutually exclusive, but are intended to indicate that a particular feature, structure or characteristic described in connection with this embodiment may be included in at least one embodiment. Such generic terms as used herein are not necessarily all referring to the same embodiment. Any embodiment may be combined, inclusively or exclusively, with any other embodiments in a manner consistent with the aspects and embodiments disclosed herein.

References to "or" may be construed as inclusive, such that any term described using "or" may indicate any one of a single, more than one, and all of the stated items.

Terms including ordinal numbers (such as first, second, etc.) may be used to describe various elements, but these elements are not limited by the terms. The above terms are only used to distinguish one element from another. For example, a first element may be termed a second element, and, similarly, a second element may be termed a first element, without departing from the scope of the present disclosure. The term "and/or" includes any combination of a plurality of associated items or any one of the plurality of associated items.

The technical solutions of the embodiments of the present application may be applied to various communication systems, for example: global system for mobile communications (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD), universal mobile telecommunication system (UMTS), worldwide interoperability for microwave access (WiMAX) communication system, 5th generation (5G) system or new radio (NR) and the like. In addition, the technical solutions of the embodiments of the present application may be applied to future-oriented communication technologies.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "terminal," "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2B:
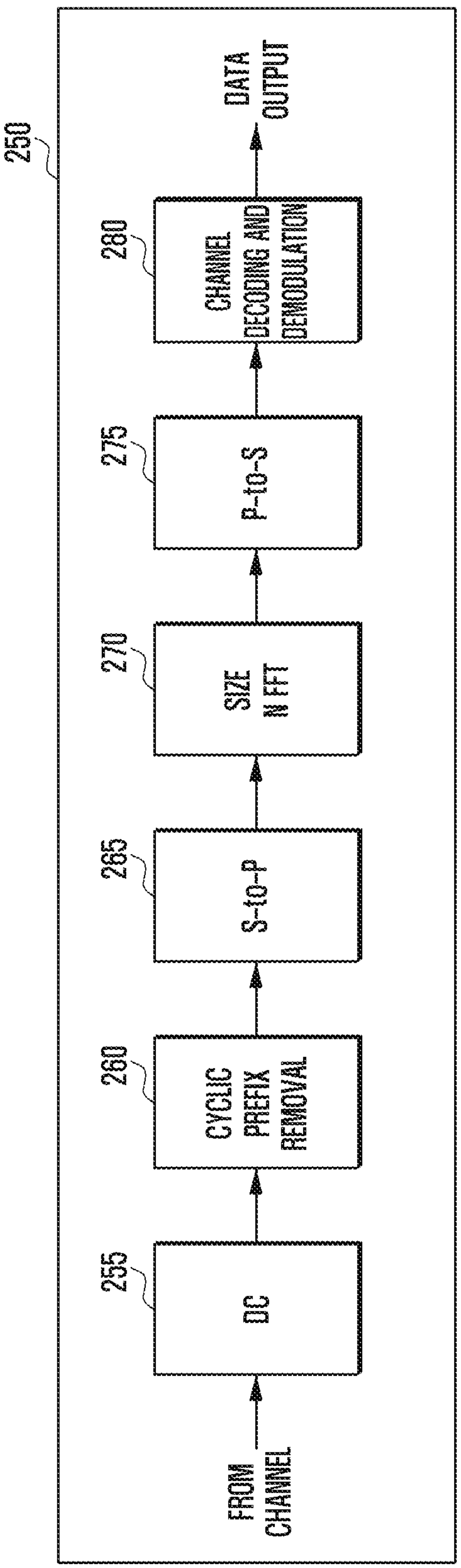
FIG. 2B illustrates example wireless transmission and reception paths respectively according to the present disclosure.

FIGS. 2A and 2B illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

FIG. 3A illustrates an example UE 116 according to the present disclosure. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

FIG. 3B illustrates an example gNB 102 according to the present disclosure. The embodiment of gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. It should be noted that gNB 101 and gNB 103 can include the same or similar structures as gNB 102.

As shown in FIG. 3B, gNB 102 includes a plurality of antennas 370*a*-370*n*, a plurality of RF transceivers 372*a*-372*n*, a transmission (TX) processing circuit 374, and a reception (RX) processing circuit 376. In certain embodiments, one or more of the plurality of antennas 370*a*-370*n* include a 2D antenna array. gNB 102 also includes a controller/processor 378, a memory 380, and a backhaul or network interface 382.

RF transceivers 372*a*-372*n* receive an incoming RF signal from antennas 370*a*-370*n*, such as a signal transmitted by UEs or other gNBs. RF transceivers 372*a*-372*n* down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372*a*-372*n* receive the outgoing processed baseband or IF signal from TX processing circuit 374 and upconvert the baseband or IF signal into an RF signal transmitted via antennas 370*a*-370*n*.

The controller/processor 378 can include one or more processors or other processing devices that control the overall operation of gNB 102. For example, the controller/processor 378 can control the reception of forward channel signals and the transmission of backward channel signals through the RF transceivers 372*a*-372*n*, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372*a*-372*n*, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Embodiment 1

With the increasing popularity and continuous evolution of wireless communication networks, various applications emerge one after another, and users' requirements for communication rates are also increasing. In order to meet such requirements, one way is to employ a high-order modulation mode, for example, by supporting 256QAM in the existing NR and LTE systems. However, the employment of the high-order modulation will inevitably increase the peak-to-average power ratio of a transmitted signal. When the transmit power is large, nonlinear distortion of the transmitted signal will be caused, thereby affecting the receiving performance. In consideration of the differences in manufacturing cost and dimension constraints between terminal equipment and base station equipment, the performance of hardware such as power amplifiers used by terminals is often inferior to those used by base stations. Accordingly, the nonlinear distortion of such a transmitted signal is more severe for uplink transmission.

At present, Error Vector Magnitude (EVM) requirements that a terminal should meet when transmitting signal in each of the respective modulation mode are set in the protocol (EVM may measure the degree of signal distortion). When a terminal employs a high-order modulation mode to transmit a signal, the following case may occur: the signal transmit power of the terminal side has not yet reached the rated transmit power, but the actual EVM cannot meet the EVM requirements specified in the protocol, implying that when the high-order modulation mode is employed, the terminal cannot transmit the uplink signal in a rated lower, and it transmits with the transmit power being always less than the rated power, which will cause loss of uplink coverage.

This problem may be alleviated by improving the receiver performance. For example, with a neural network-based receiver, if training data is a received signal, which arrives at the receiving side through the transmission channel due to a transmitted signal including nonlinear distortion, and the nonlinear characteristics of the training data are the same as those of the actually received data, in theory, the neural network-based receiver may handle the reception of the transmitted signal including nonlinear distortion, thereby relaxing the EVM requirements for the transmitted signal and improving coverage.

The present invention proposes a method for configuring, generating and transmitting a reference signal, such that the reference signal has the same nonlinear characteristics as the physical channel, so that the reference signal may be used as training data for a receiver for receiving the physical channel, to improve the receiving performance of the physical channel, and relax the EVM requirement for transmitting the physical channel, and achieving the purpose of improving the transmit power and coverage performance.

FIG. 4 illustrates an example method 400 in accordance with the present disclosure. In step 401, a terminal determines a configuration of a reference signal. In step 402, the terminal transmits/receives the reference signal according to the configuration.

In one embodiment, determining the configuration of the reference signal comprises determining one or more of the following: information related to transmit power of the reference signal; information related to a modulation mode of the reference signal; information related to waveform of the reference signal; information related to transmission bandwidth of the reference signal; or information related to antenna ports for the reference signal.

The reference signal has at least one of the following characteristics: its transmit power being associated with a transmit power of corresponding physical channel(s) or physical signal(s), its modulation mode being associated with a modulation mode of the corresponding physical channel(s) or physical signal(s), its waveform being associated with a transmission waveform of the corresponding physical channel(s) or physical signal(s), its transmission bandwidth being associated with a transmission bandwidth of the corresponding physical channel(s) or physical signal(s), and its antenna ports being associated with antenna ports for the corresponding physical channel(s) or physical signal(s). And, the corresponding physical channel(s) or physical signal(s) may be one or more, preferably, in the case where the reference signal is an uplink reference signal, the corresponding physical channel(s) or physical signal(s) is an uplink physical channel or physical signal, such as an uplink shared channel (Physical Uplink Shared Channel (PUSCH), etc.); and in the case where the reference signal is a downlink reference signal, the corresponding physical channel(s) or physical signal(s) is a downlink physical channel or physical signal, such as a downlink shared channel (Physical Downlink Shared Channel (PDSCH), etc.). This design may ensure that the reference signal has the same transmit power and/or modulation mode and/or waveform and/or transmission bandwidth and/or antenna ports as the corresponding physical channel(s) or physical signal(s), so as to ensure that the reference signal has the same peak-to-average power ratio as the corresponding physical channel(s) or physical signal(s), that is, the same nonlinear characteristics, so that the reference signal may be used as training data for a neural network based-receiver for receiving the respective physical channel(s) or physical signal(s), to improve the receiving performance of the corresponding physical channel(s) or physical signal(s), and relax the EVM requirement for transmitting the corresponding physical channel(s) or physical signal(s) and the like. The specific implementation details will be described below by taking the corresponding physical channel(s) as an example. For brevity of description, unless otherwise specified, in this document, "corresponding physical channel(s) or physical signal(s)" and "corresponding physical channel(s)" may be used interchangeably.

In a further embodiment, determining the configuration of the reference signal comprises determining one or more of the following: information related to a transmit power of the reference signal; information related to a modulation mode of the reference signal; information related to a waveform of the reference signal; information related to a transmission bandwidth of the reference signal; or information related to antenna ports for the reference signal. In a further embodiment, determining the configuration of the reference signal comprises at least one of the following: receiving the configuration of the reference signal through higher-layer signaling and/or downlink control information; or determining a configuration of respective physical channel(s)/physical signal(s), and determining the configuration of the reference signal according to the configuration of the corresponding physical channel(s)/physical signal(s).

The specific implementation in which the terminal obtains the reference signal physical resource configuration may comprises: the terminal obtaining a time unit configuration of the reference signal, where the configured time units may be periodic and/or aperiodic. Specifically, the specific implementation in which the terminal obtains the time unit configuration of the reference signal may be that the terminal obtains information related to the time unit configuration of the reference signal through higher-layer signaling and/or downlink control information. In one embodiment, the related information may be information related to a parameter, where the higher-layer signaling comprises at least one of the following: radio resource control (RRC) signaling, and medium access control control element (MAC CE). And, the time unit configuration of the reference signal obtained by the terminal comprises at least one of the following: a period of the time unit(s), number of the time units in a single period, position(s) of the time unit(s) in a single period, number of training/repetition times of the time unit(s) in a single period, number of aperiodic time units, position(s) of the aperiodic time unit(s), and number of training times/repetition times of the aperiodic time unit(s).

And, specifically, the method of the terminal obtaining the period of the time unit(s) may also be that with the period of the time unit(s) being associated with a configuration period of the corresponding physical channel(s), the terminal takes a period of a specific physical channel as the period of the time unit(s). Specifically, the specific physical channel may be one of an uplink shared channel and a downlink shared channel, wherein the terminal may obtain period configuration information (e.g., parameters) according to a configured grant signaling of the uplink shared channel, and determine the period according to the obtained period configuration information, or the terminal may obtain the period configuration information according to a semipersistent scheduling configuration of the downlink shared channel, and determine the period according to the obtained period configuration information.

And, specifically, the implementation in which the terminal obtains the number of the time units of the reference signal in a single period or the number of the aperiodic time unit(s) of the reference signal may be that the terminal obtains configuration information of the number of the time units of the reference signal in a single period or the number of the aperiodic time unit(s) of the reference signal; or the terminal obtains configuration information of number of the training times/repetition times, and calculates the number of the time units of the reference signal in a single period or the number of the aperiodic time unit(s) of the reference signal according to the number of the training times/repetition times and number of antenna ports for the reference signal. In a specific example, the configured number N of the time units of the reference signal in a single period or the configured number of the aperiodic time unit(s) of the reference signal is a multiple of the number of the antenna ports for the reference signal, for example, N=N_port× N_train, where N_port is the number of the antenna ports for the reference signal, and N_train is the number of training/ repetition times. This design takes into account that the nonlinear characteristics of the signals transmitted by different antenna ports may be different, and the training of the neural network needs to be performed in time division. Therefore, the reference signals of different antenna ports should be transmitted in different time units, and should be transmitted several times under the requirement of the number of training times of the neural network.

In a further embodiment, the positions of the time units of the reference signal in a single period or the aperiodic time unit(s) of the reference signal comprise at least one of the following: information related to position of first symbol in the time unit(s); information related to positions of last symbol in the time unit(s); intervals between the first symbol in the time unit(s) and last symbols of demodulation reference signals of uplink/downlink shared channel; intervals between the last symbol in the time unit(s) and first symbols of the demodulation reference signals of uplink/downlink shared channel; intervals between the first symbol in the time unit(s) and the last symbols of the uplink/downlink shared channel; or intervals between the last symbol in the time unit(s) and the first symbols of the uplink/downlink shared channel.

Specifically, the positions of the time units of the reference signal in a single period or the aperiodic time unit(s) of the reference signal obtained by the terminal are configured in one or more implementation of the following: preconfiguring or configuring based on the configuration information from the base station, the positions of the first symbols in the determined time units; preconfiguring or configuring based on the configuration information from the base station, the positions of the last symbols in the determined time units; preconfiguring or configuring based on the configuration information from the base station, the first symbols in the determined time units, as being spaced N time units apart from the last symbols of the demodulation reference signals of uplink/downlink shared channel; or preconfiguring or configuring based on the configuration information from the base station, the last symbols in the determined time units, as being spaced N time units apart from the first symbols of the demodulation reference signals of uplink/downlink shared channel; or preconfiguring or configuring based on the configuration information from the base station, the first symbols in the determined time units, as being spaced N time units apart from the last symbols of the demodulation reference signals of uplink/downlink shared channel; or preconfiguring or configuring based on the configuration information from the base station, the last symbols in the determined time units, as being spaced N time units apart from the first symbols of the demodulation reference signals of uplink/downlink shared channel, where N is an integer greater than or equal to zero.

More specifically, positions of time-domain symbols of the time units of the reference signal in a single period or the aperiodic time unit(s) of the reference signal obtained by the terminal may be that first symbols of the time-domain symbols obtained by the terminal are spaced N time units apart from last symbols of demodulation reference signals of uplink/downlink shared channel; or last symbols of the time-domain symbols obtained by the terminal are spaced N time units apart from first symbols of the demodulation reference signals of uplink/downlink shared channel; or the first symbols of the time-domain symbols obtained by the terminal are spaced N time units apart from last symbols of the uplink/downlink shared channel; or the last symbols of the time-domain symbols obtained by the terminal are spaced N time units apart from the first symbols of the uplink/downlink shared channel, where the time units may be at least one of a slot, time-domain symbol, and mini-slot; and the value of N may be an integer greater than or equal to zero, and may be a fixed value or a configured value obtained by the terminal according to higher-layer signaling/ downlink control information/MAC CE. In one further embodiment, the positions of the time-domain symbols of the reference signal obtained by the terminal may be part of time-domain symbols of the demodulation reference signal of uplink/downlink shared channel. In this case, the reference signal may be a demodulation reference signal or part of the demodulation reference signal.

And, specifically, in the case where the time unit configuration obtained by the terminal is a periodic time unit configuration, the terminal may obtain at least one of the following configurations through higher-layer signaling: a period of the time unit(s), number of the time units in a single period, and position(s) of the time unit(s) in a single period; and obtain an indication message for enabling the periodic time unit configuration through downlink control information, the indication message being used to indicate whether to enable the periodic time unit configuration, that is, whether the terminal periodically transmits or receives the reference signal from the moment of being enabled.

And, specifically, in the case where the time unit configuration obtained by the terminal is an aperiodic time unit configuration, the terminal may obtain at least one of the following configurations through higher-layer signaling: number of the aperiodic time units, positions of the aperiodic time units, and number of training times/repetition times of the aperiodic time units; and obtain an indication message for enabling the aperiodic time unit configuration through downlink control information, the indication message being used to indicate whether to enable the aperiodic time unit configuration, and/or whether the positions of the aperiodic time units are associated with position(s) of time unit(s) of uplink/downlink shared channel scheduled by the downlink control information.

The terminal obtaining the physical resource configuration of the reference signal may specifically further comprise: the terminal obtaining a bandwidth configuration of the reference signal, or determining a bandwidth of the reference signal according to association of a transmission bandwidth of the reference signal with a bandwidth of a specific physical channel. In the case where the terminal determines the bandwidth of the reference signal according to the association of the transmission bandwidth of the reference signal with the bandwidth of the specific physical channel/physical signal, the step of the terminal determining the bandwidth of the reference signal comprises: the terminal obtaining the bandwidth configuration of the specific physical channel, and determining the bandwidth of the reference signal according to the association with the bandwidth of the specific physical channel/physical signal. Preferably, the bandwidth of the reference signal is the same as that of the specific physical channel or physical signal. This design is to ensure that the reference signal has the same nonlinear characteristics as the specific physical channel, so that the reference signal may be used for neural network training of a receiver for the specific physical channel. Specifically, the specific meaning of the bandwidths being the same encompasses at least one of the following: number of physical resource blocks included in the bandwidth of the specific reference signal being the same as number of physical resource blocks allocated for the specific physical channel, indexes of physical resource blocks included in the bandwidth of the specific reference signal being the same as indexes of physical resource blocks allocated for the specific physical channel, or there being a fixed index difference between the indexes of physical resource blocks included in the bandwidth of the specific reference signal and the indexes of physical resource blocks allocated for the specific physical channel, where the fixed index difference may be a fixed value or obtained by the terminal through higher-layer signaling and/or downlink control information. And, in an embodiment, the method of the terminal obtaining the bandwidth configuration of the reference signal comprises: the terminal obtaining the bandwidth configuration of the reference signal through the higher-layer signaling and/or downlink control information, where the higher-layer signaling comprises at least one of the following: RRC signaling and MAC CE.

In an embodiment, preferably, the meaning of the transmit power of the reference signal being associated with the transmit power of the specific physical channel or the physical signal may encompass: the transmit power of the reference signal is the same as the transmit power of the specific physical channel or the physical signal. This design is to ensure that the reference signal has the same nonlinear characteristics as the specific physical channel, so that the reference signal may be used for neural network training of a receiver for the specific physical channel. Furthermore, the specific implementations in which the terminal obtains the transmit power of the reference signal may comprise: in the case where the reference signal is of uplink, the terminal determining an uplink transmit power of the reference signal according to power control information (e.g., related parameters) of the specific physical channel; or, in the case where the reference signal is of downlink, the terminal expecting that a downlink transmit power of the reference signal is the same as that of the specific physical channel. Specifically, in the case where the reference signal is of downlink, and it cannot be guaranteed that a transmit power of the downlink reference signal and that of the specific physical channel are the same, the terminal may obtain corresponding indication information which indicates that the transmit powers of the downlink reference signal and the specific physical channel are different. In an embodiment, the terminal may not perform neural network training of the receiver for the specific physical channel using the reference signal. Specifically, the reference signal may not be transmitted/received for neural network training of the receiver for the specific physical channel, where the indication information may be obtained by the terminal through higher-layer signaling and/or downlink control information, and where the high-level signaling comprises at least one of the following: RRC signaling, or MAC CE.

In an embodiment, preferably, the meaning of the waveform of the reference signal being associated with the waveform of the specific physical channel or physical signal may comprise: the waveform of the reference signal being the same as the waveform of the specific physical channel or physical signal. This design is to ensure that the reference signal has the same nonlinear characteristics as the specific physical channel or physical signal, so that the reference signal may be used for neural network training of a receiver for the specific physical channel. An example in which the waveforms are the same is that, in the case where the reference signal is an uplink reference signal and the specific physical channel is an uplink shared channel, the uplink shared channel is configured to enable transformed precoding, and then the modulated signal of the reference signal also needs to be mapped to resource elements after the transformed precoding; on the contrary, if the uplink shared channel is configured not to enable transformed precoding, the modulated signal of the reference signal is directly mapped to resource elements (without transformed precoding).

In an embodiment, preferably, the meaning of the modulation mode of the reference signal being associated with the modulation mode of the specific physical channel or physical signal may comprise: the modulation mode of the reference signal being the same as the modulation mode of the specific physical channel or physical signal. This design is to ensure that the reference signal has the same nonlinear characteristics as the specific physical channel or physical signal, so that the reference signal may be used for neural network training of a receiver for the specific physical channel. Furthermore, a specific implementation in which the terminal obtains the modulation mode of the reference signal comprise: the terminal obtaining an indication of the modulation mode of the reference signal through high-layer signaling and/or downlink control information, where the high-layer signaling comprises at least one of the following: RRC signaling, or MAC CE. Alternatively, another specific implementation in which the terminal obtains the modulation mode of the reference signal comprises: the terminal determining the modulation mode of the reference signal according to a modulation mode of the specific physical channel; that is, taking the modulation mode configured for the specific physical channel as the modulation mode of the reference signal. Alternatively, another specific implementation in which the terminal obtains the modulation mode of the reference signal comprises: the modulation mode of the reference signal being a fixed modulation mode, such as 256QAM, and in this case, the reference signal may only be used for neural network training of a receiver for transmitting the physical channel using 256QAM. And, furthermore, a specific implementation in which the terminal generates the modulated symbols of the reference signal comprises: the terminal generating a bit sequence with a length of N, and then modulating the bit sequence in the modulation mode of the reference signal to generate the modulated symbols of the reference signal, where the value of N may be determined by the terminal according to an order of the modulation mode and number of resource elements/subcarriers to which the sequence of the reference signal is mapped, for example, N is a product of the order of the modulation mode and the number of resource elements/subcarriers to which the sequence of the reference signal is mapped. In an embodiment, more specifically, the specific implementation of the bit sequence generated by the terminal may be at least one of the following: an all-zero sequence, an all-one sequence, a pseudo-random sequence (for example, a pseudo-random sequence in a new radio (NR) system, that is, a PN sequence); or, the specific implementation of the bit sequence generated by the terminal may be a sequence generated after scrambling a specific bit sequence, where the specific bit sequence is at least one of the following: an all-zero sequence, an all-one sequence, a PN sequence (e.g., a PN sequence in NR). Furthermore, according to the waveform of the reference signal, the generated modulated symbols may be directly mapped to the physical resources of the reference signal, or the generated modulated symbol may be mapped to the physical resources of the reference signal after waveform transformation, a specific example of which is to enable transformed precoding.

Preferably, the meaning of the antenna ports for the reference signal being associated with the antenna ports for the specific physical channel may comprise: any antenna port for the reference signal is the same as at least one of the antenna ports for the specific physical channel or physical signal. This design is to ensure that the reference signal has the same nonlinear characteristics as the specific physical channel or physical signal, so that the reference signal may be used for neural network training of a receiver for the specific physical channel. In an embodiment, the number of antenna ports for the reference signal may be less than or equal to the number of antenna ports for the specific physical channel. And, the antenna ports for the specific physical channel means antenna ports for the specific physical channel or for demodulation the reference signal of the specific physical channel.

A method for configuring, generating and transmitting a reference signal may be further characterized in the following method of a terminal transmitting an uplink reference signal (which is received by a base station), where in time unit(s) to which the reference signal is allocated, the terminal does not transmit any uplink channel/uplink signal, and/or does not expect to receive any downlink channel/downlink signal, the same applies even outside a frequency bandwidth over which the reference signal is transmitted. This uplink reference signal design may be used for neural network-based training of a receiver on base station side, so that the uplink reference signal transmitted by the terminal and received by the base station for the training does not alias with other signals in the time domain, thereby ensuring the accuracy of the neural network training performed in the time domain. And, correspondingly, a method for configuring, generating and transmitting a reference signal may be further characterized in the following method of a terminal receiving an downlink reference signal (which is transmitted by a base station), where in time unit(s) to which the reference signal is allocated, the terminal does not transmit any uplink channel/uplink signal, and/or does not receive any downlink channel/downlink signal, the same applies even outside a frequency bandwidth of the reference signal. This downlink reference signal design may be used for neural network-based training of a receiver on terminal side, so that the downlink reference signal transmitted by the base station and received by the terminal for the training does not alias with other signals in the time domain, thereby ensuring the accuracy of the neural network training performed in the time domain.

A method for configuring, generating and transmitting a reference signal may be further characterized in: in the case where time unit(s) of the reference signal is configured to be periodic and the reference signal is an uplink reference signal, a terminal determining whether to transmit the reference signal in duration of a single period according to transmission of a specific uplink physical channel in duration of the period. Preferably, the specific uplink physical channel may be an uplink shared channel. Specifically, in the case where the terminal transmits a specific uplink physical channel in duration of a single period, the terminal transmits the reference signal in duration of the period; otherwise, the terminal does not transmit the reference signal. And, preferably, in the case where the terminal transmits a specific uplink physical channel/physical signal in a duration of a single period, and a time for transmitting the specific uplink physical channel/physical signal in the duration is after a timing when the reference signal is scheduled to be transmitted, the terminal transmits the reference signal in duration of the period; otherwise, the terminal does not transmit the reference signal. The advantage of this design is that if the transmitted reference signal could not be used for neural network training of receiving a specific uplink physical channel/physical signal on base station side, the reference signal may not be transmitted, so as to conserve energy consumption by the terminal and save system uplink resources.

A method for configuring, generating and transmitting a reference signal may be further characterized in: in the case where time unit(s) of the reference signal is configured to be periodic and the reference signal is a downlink reference signal, a terminal determining whether to receive the reference signal in duration of a single period according to reception of a specific downlink physical channel in duration of the period. Preferably, the specific downlink physical channel may be a downlink shared channel. Specifically, in the case where the terminal receives a specific downlink physical channel/physical signal in duration of a single period, the terminal also receives the reference signal in duration of the period; otherwise, the terminal does not expect to receive the reference signal. And, preferably, in the case where the terminal receives a specific downlink physical channel/physical signal in a duration of a single period, and a time for receiving the specific downlink physical channel/physical signal in the duration is after a timing when the reference signal is scheduled to be received, the terminal receives the reference signal in duration of the period; otherwise, the terminal does not expect to receive the reference signal. The advantage of this design is that if the downlink reference signal cannot be used for neural network training of receiving a specific uplink physical channel/physical signal on terminal side, the reference signal may not be expected to be received, so as to conserve energy consumption by the terminal and save system uplink resources.

Although it is described in the above embodiment that the above method is performed by the terminal, the above method may also be performed by the base station with possible minor modifications known by those skilled in the art, or by the base station and the terminal in cooperation correspondingly.

While one or more embodiments have been described with reference to the accompanying drawings, persons skilled in the art will understand that various changes in form and details may be made therein without departing from the spirit and scope as defined by the appended claims.

FIG. 5 illustrates an electronic device (i.e terminal, UE . . . ) according to embodiments of the present disclosure. Referring to the FIG. 5, the electronic device 500 may include a processor (or a controller) 510, a transceiver 520 and a memory 530. However, all of the illustrated components are not essential. The electronic device 500 may be implemented by more or less components than those illustrated in FIG. 5. In addition, the processor 510 and the transceiver 520 and the memory 530 may be implemented as a single chip according to another embodiment.

The electronic device 500 may correspond to electronic device described above. For example, the electronic device 500 may correspond to the terminal or the UE. The aforementioned components will now be described in detail.

The processor 510 may include one or more processors or other processing devices that control the proposed function, process, and/or method. Operation of the electronic device 500 may be implemented by the processor 510.

For example, the processor configured to control to determine a configuration of the reference signal, and control the transceiver to transmit, to a base station, the reference signal or receive, from the base station, the reference signal, according to the configuration, wherein the configuration of the reference signal includes at least one of information related to transmit power of the reference signal, information related to modulation mode of the reference signal, information related to waveform of the reference signal, information related to transmission bandwidth of the reference signal, or information related to antenna ports for the reference signal.

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 520 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the electronic device 500. The memory 530 may be connected to the processor 510 and store at least one instruction or a protocol or a parameter for the proposed function, process, and/or method. The memory 530 may include read-only memory (ROM) and/or random access memory (RAM) and/or hard disk and/or CD-ROM and/or DVD and/or other storage devices.

FIG. 6 illustrates a node entity according to embodiments of the present disclosure.

Referring to the FIG. 6, the node entity 600 may include a processor (or a controller) 610, a transceiver 620 and a memory 630. However, all of the illustrated components are not essential. The node entity 600 may be implemented by more or less components than those illustrated in FIG. 6. In addition, the processor 610 and the transceiver 620 and the memory 630 may be implemented as a single chip according to another embodiment.

The node 600 may include "gNodeB (gNB)". Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE".

The aforementioned components will now be described in detail.

The processor 610 may include one or more processors or other processing devices that control the proposed function, process, and/or method. Operation of the node entity 600 may be implemented by the processor 610.

For example, the processor is configured to determine a configuration of the reference signal, and control the transceiver to transmit, to a User Equipment (UE), the reference signal or receive, from the UE, the reference signal, according to the configuration, wherein the configuration of the reference signal includes at least one of information related to transmit power of the reference signal, information related to modulation mode of the reference signal, information related to waveform of the reference signal, information related to transmission bandwidth of the reference signal, or information related to antenna ports for the reference signal.

The transceiver 620 may be connected to the processor 610 and transmit and/or receive a signal. The signal may include control information and data. In addition, the transceiver 620 may receive the signal and output the signal to the processor 610. The transceiver 620 may transmit a signal output from the processor 610.

The memory 630 may store the control information or the data included in a signal obtained by the node entity 600. The memory 630 may be connected to the processor 610 and store at least one instruction or a protocol or a parameter for the proposed function, process, and/or method. The memory 630 may include read-only memory (ROM) and/or random access memory (RAM) and/or hard disk and/or CD-ROM and/or DVD and/or other storage devices.

By virtue of an embodiment of the present invention, improved performance and better security is provided in the realm of disaster roaming.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a User Equipment (UE) in a wireless communication system, the method comprising:

determining a configuration of a reference signal (RS) corresponding to a physical channel or a physical signal;

in case that the physical channel or the physical signal is transmitted or received in a duration of a period and a time for transmitting or receiving the physical channel or the physical signal in the duration is after a timing when the reference signal is scheduled to be transmitted, transmitting or receiving the reference signal with a base station in the duration of the period based on the configuration; and in case that the physical channel or the physical signal is transmitted or received in the duration of the period and the time for transmitting or receiving the physical channel or the physical signal in the duration is before the timing when the reference signal is scheduled to be transmitted, skipping transmitting or receiving the reference signal in the duration of the period, wherein the reference signal is training data for a neural network and has the same nonlinear characteristic as the physical channel or the physical signal, and wherein the configuration of the reference signal includes at least one of information associated with a transmit power, modulation mode, transmission bandwidth, or antenna ports for the reference signal.

2. The method of claim 1, wherein determining the configuration of the reference signal comprises at least one of the following:

receiving, from the base station via a higher-layer signaling or downlink control information, physical resource configuration information for training the reference signal corresponding to the physical channel or the physical signal, wherein the physical resource configuration information includes time unit configuration information and the time unit configuration information includes a period (T) of a time unit, a number of the time unit in the period, a position of the time unit in a single period, a number of aperiodic time units, a position of the aperiodic time unit, or a number of training times of the aperiodic time unit; or determining a respective physical channel or a physical signal, and determining the configuration of the reference signal to be the same as the configuration of the corresponding physical channel or the physical signal.

3. The method of claim 1, wherein the UE does not transmit or receive the physical channel or the physical signal in a time unit allocated to the reference signal.

4. The method of claim 1, further comprising:

in case that a time unit of the reference signal is configured to be periodic, determining whether to transmit or receive the reference signal in the duration of the period, based on transmissions of the corresponding physical channel or physical signal in the duration of the period, wherein the reference signal is a demodulation reference signal and a position of the time unit of the reference signal is part of time units of the demodulation reference signal.

5. The method of claim 1, wherein the transmit power, the modulation mode, the waveform, the transmission bandwidth, and the antenna ports of the RS are the same as those of the physical channel or the physical signal.

6. A User Equipment (UE) in a wireless communication system, the UE comprising:

a transceiver; and a processor configured to;

determine a configuration of a reference signal (RS) corresponding to a physical channel or a physical signal, in case that the physical channel or the physical signal is transmitted or received in a duration of a period and a time for transmitting or receiving the physical channel or the physical signal in the duration is after a timing when the reference signal is scheduled to be transmitted, transmit or receive the reference signal with a base station in the duration of the period, based on the configuration, and in case that the physical channel or the physical signal is transmitted or received in the duration of the period and the time for transmitting or receiving the physical channel or the physical signal in the duration is before the timing when the reference signal is scheduled to be transmitted, skip transmitting or receiving the reference signal in the duration of the period, wherein the reference signal is training data for a neural network and has the same nonlinear characteristic as the physical channel or the physical signal, and wherein the configuration of the reference signal includes at least one of information associated with a transmit power, modulation mode, waveform, transmission bandwidth, or antenna ports for the reference signal.

7. The UE of claim 6, wherein the processor is further configured to receive, from the base station via a higher-layer signaling or downlink control information, physical resource configuration information for training the reference signal corresponding to the physical channel or the physical signal, wherein the physical resource configuration information includes time unit configuration information and the time unit configuration information includes a period (T) of a time unit, a number of the time unit in the period, a position of the time unit in a single period, a number of aperiodic time units, a position of the aperiodic time unit, or a number of training times of the aperiodic time unit, or determine a respective physical channel or a physical signal, and determine the configuration of the reference signal to be the same as the configuration of the corresponding physical channel or the physical signal.

8. The UE of claim 6,
wherein the UE does not transmit or receive the physical channel or the physical signal in a time unit allocated to the reference signal.

9. The UE of claim 6, wherein the processor is further configured to:
in case that a time unit of the reference signal is configured to be periodic, determine whether to transmit or receive the reference signal in the duration of the period, based on transmissions of the corresponding physical channel or physical signal in the duration of the period,
wherein the reference signal is a demodulation reference signal and a position of the time unit of the reference signal is part of time units of the demodulation reference signal.

10. The UE of claim 6, wherein the transmit power, the modulation mode, the waveform, the transmission bandwidth, and the antenna ports of the RS are the same as those of the physical channel or the physical signal.

11. A method performed by a base station in a wireless communication system, the method comprising:
determining a configuration of a reference signal (RS) corresponding to a physical channel or a physical signal;
in case that the physical channel or the physical signal is transmitted or received in a duration of a period and a time for transmitting or receiving the physical channel or the physical signal in the duration is after a timing when the reference signal is scheduled to be transmitted, transmitting or receiving the reference signal with a user equipment (UE) in the duration of the period, based on the configuration; and
in case that the physical channel or the physical signal is transmitted or received in the duration of the period and the time for transmitting or receiving the physical channel or the physical signal in the duration is before the timing when the reference signal is scheduled to be transmitted, skipping transmitting or receiving the reference signal in the duration of the period,
wherein the reference signal is training data for a neural network and has the same nonlinear characteristic as the physical channel or the physical signal, and
wherein the configuration of the reference signal includes at least one of information associated with a transmit power, modulation mode, waveform transmission bandwidth, or antenna ports for the reference signal.

12. The method of claim 11, further comprising:
transmitting, to the UE via a higher-layer signaling or downlink control information, physical resource configuration information for training the reference signal corresponding to the physical channel or the physical signal, wherein the physical resource configuration information includes time unit configuration information and the time unit configuration information includes a period (T) of a time unit, a number of the time unit in the period, a position of the time unit in a single period, a number of aperiodic time units, a position of the aperiodic time unit, or a number of training times of the aperiodic time unit.

13. The method of claim 11, wherein the base station does not transmit or receive the physical channel or the physical signal in a time unit allocated to the reference signal.

14. The method of claim 11, further comprising:
in case that a time unit of the reference signal is configured to be periodic, determining whether to transmit or receive the reference signal in the duration of the period, based on transmissions of the corresponding physical channel or physical signal in the duration of the period,
wherein the reference signal is a demodulation reference signal and a position of the time unit of the reference signal is part of time units of the demodulation reference signal.

15. The method of claim 11, wherein the transmit power, the modulation mode, the waveform, the transmission bandwidth, and the antenna ports of the RS are the same as those of the physical channel or the physical signal.

16. A base station in a wireless communication system, the base station comprising:
a transceiver; and
a processor configured to:
determine a configuration of a reference signal (RS) corresponding to a physical channel or a physical signal;
in case that the physical channel or the physical signal is transmitted or received in a duration of a period and a time for transmitting or receiving the physical channel or the physical signal in the duration is after a timing when the reference signal is scheduled to be transmitted, transmit or receive the reference signal with a user equipment (UE) in the duration of the period, based on the configuration; and
in case that the physical channel or the physical signal is transmitted or received in the duration of the period and the time for transmitting or receiving the physical channel or the physical signal in the duration is before the timing when the reference signal is scheduled to be transmitted, skip transmitting or receiving the reference signal in the duration of the period,
wherein the reference signal is training data for a neural network and has the same nonlinear characteristic as the physical channel or the physical signal, and
wherein the configuration of the reference signal includes at least one of information associated with a transmit power, modulation mode, waveform, transmission bandwidth, or antenna ports for the reference signal.

17. The base station of claim 16, wherein the processor is further configured to:
transmit, to the UE via a higher-layer signaling or downlink control information, physical resource configuration information for training the reference signal corresponding to the physical channel or the physical signal, wherein the physical resource configuration information includes time unit configuration information and the time unit configuration information includes a period (T) of a time unit, a number of the time unit in the period, a position of the time unit in a single period, a number of aperiodic time units, a position of the aperiodic time unit, or a number of training times of the aperiodic time unit.

18. The base station of claim 16, wherein the base station does not transmit or receive the physical channel or the physical signal in a time unit allocated to the reference signal.

19. The base station of claim 16, wherein the processor is further configured to:
in case that a time unit of the reference signal is configured to be periodic, determine whether to transmit or receive the reference signal in the duration of the period, based on transmissions of the corresponding physical channel or physical signal in the duration of the period, wherein the reference signal is a demodulation reference signal and a position of the time unit of the reference signal is part of time units of the demodulation reference signal.

20. The base station of claim 16, wherein the transmit power, the modulation mode, the waveform, the transmission bandwidth, and the antenna ports of the RS are the same as those of the physical channel or the physical signal.

* * * * *